March 2, 1971   G. ZÜHLKE ET AL   3,566,474
DENTIST'S MIRROR
Original Filed April 25, 1969   2 Sheets-Sheet 1

INVENTOR.
GERHARD ZÜHLKE
PAUL BRANDLI
MAX SPAETI

March 2, 1971 G. ZÜHLKE ET AL 3,566,474
DENTIST'S MIRROR
Original Filed April 25, 1969 2 Sheets-Sheet 2

INVENTOR.
GERHARD ZÜHLKE
PAUL BRANDLI
MAX SPALTI

United States Patent Office 3,566,474
Patented Mar. 2, 1971

3,566,474
DENTIST'S MIRROR
Gerhard Zühlke, Geroldswil, and Paul Brandli and Max Spalti, Zurich, Switzerland, assignors to Zuhlke & Brandli A.G., Zurich, Switzerland
Original application Apr. 25, 1969, Ser. No. 819,404. Divided and this application July 14, 1969, Ser. No. 841,289
Claims priority, application Switzerland, Aug. 14, 1968, 12,230/68
Int. Cl. A61c 3/00
U.S. Cl. 32—69    13 Claims

ABSTRACT OF THE DISCLOSURE

A mirror including an elongated handle, the mirror comprising a blank of strongly light-reflecting synthetic thermoplastic material clamped between annular male and female mirror frame portions. The blank comprises a marginal portion and the male mirror frame portion serves to move the marginal portion of the blank against the internal surface of the female mirror frame portion.

CROSS-REFERENCE TO RELATED APPLICATION

The present application is a division of our copending patent application Ser. No. 819,404, filed Apr. 25, 1969.

BACKGROUND OF THE INVENTION

The present invention relates to small mirrors for use by dentists or for similar purposes and having a synthetic thermoplastic strongly light-reflecting surface.

Known in the art are a variety of different types of small mirrors which are employed by a dentist in the mouth of a patient.

One such type mirror is arranged with a fixedly secured handle and a second type is arranged so that the mirror and its stem are threadably secured in the handle. Further known are instruments in which, in order to avoid excessive light reflection or a so-called double projection, the exterior glass surface is supplied with a reflecting coating.

Since all these known types of mirrors do comprise a given mass which serves as a heat accumulator, these instruments tend to tarnish as a result of the interaction of the respiration air. Dentists, for example, try to overcome this problem by preheating the mirror usually by means of a gas flame.

On the whole, an optically trouble-free mirror image is necessary to detect the often complicated infected areas in the mouth. Those mirrors which are supplied with a reflecting coating and which, to an extent, reasonably fulfill this latter requirement, still are subject to malfunctioning in that during sterilization of such a mirror, the mirror surface may be damaged.

A further disadvantage resides in the fact that sterilization of the mirror is necessary upon each application thereof in a patient's mouth.

SUMMARY OF THE INVENTION

The present invention has as its object to provide a small mirror which suitably overcomes the above-mentioned disadvantages.

Such a mirror according to the present invention comprises a blank consisting of a light-reflecting sheet material provided with a marginal portion, and a substantially ring-shaped frame having cooperating first and second frame portions which clampingly engage the marginal portion of said blank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 3:
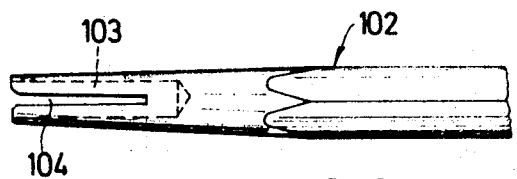
FIG. 3 is an enlarged fragmentary plan view of the handle shown in FIG. 1.
Figure 4:
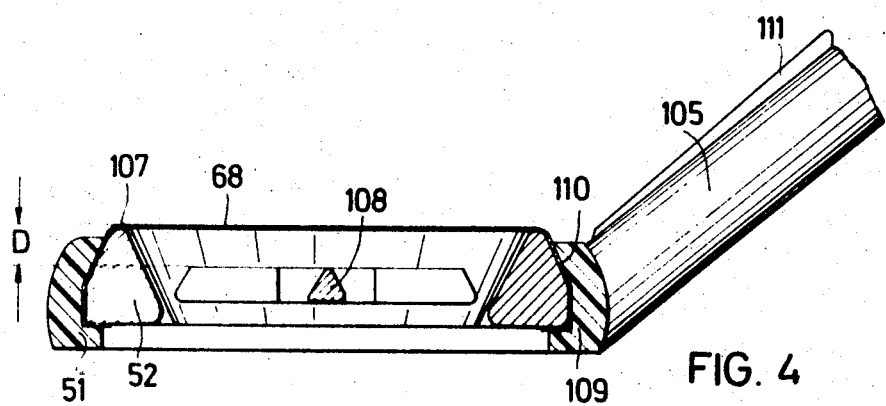
FIG. 4 is an enlarged longitudinal sectional view of the mirror, substantially as seen in the direction of arrows from the line 9—9 of FIG 2.

Referring now to drawings in which like reference numerals indicate like parts, FIGS. 1–5 illustrate details of a dentist's mirror 101 which includes the frame portions 51, 52 and a blank 68. The mirror 101 is attached to an elongated handle 102 of customary shape. The mirror 101 itself includes the frame portions 51, 52, the blank 68 and an extension or stem 105 which is receivable in a recess 103 provided in one end portion of the handle 102. The recessed end portion of the handle 102 is slotted, as at 104 to enhance its resiliency and to facilitate insertion of the stem 105. The latter is preferably provided with longitudinal ribs 111 each of which is received in one of the slots 104. The slots 104 and the ribs 111 thus prevent rotation of the mirror 101 with reference to the handle 102. As best as shown in FIG. 4, the male frame portion 52 includes a ring-shaped element which is reinforced by radially inwardly extending stiffening ribs or spokes 108. The male mirror frame portion 52 is stiffer than the female portion 51 and its external diameter exceeds somewhat the internal diameter of the portion 51 so that the latter undergoes at least some elastic expansion and at the marginal portion of the blank 68 is tightly clamped between the frame portions 51, 52 when these frame portions are assembled in a manner as shown in FIG. 4, i.e., when the portion 52 is a press-fit in the portion 51. The portion 51 has a ring-shaped lip 109 which is preferably folded over and thus overlaps the adjoining end face of the male portion 52 and the marginal portion of the blank 68 to thereby insure that the male portion 52 cannot be withdrawn from the female portion 51 and to further insure an even more reliable stretching and clamping action upon the blank. The front part of the female portion 51 is formed with a conical internal surface 110 which tapers away from the lip 109 and abuts against the complementary conical external surface of the male portion 52 when the latter is properly received in the portion 51. The internal surface 110 insures that the male portion 52 cannot be propelled forwardly beyond the front end of the passage in the female portion 51. The male portion 52 extends forwardly beyond the female portion 51 and has a rounded ring-shaped crest 107 which is adjacent to the inner side of the blank 68. The marginal portion of the blank 68 extends from the crest 107, along the conical surface 110 and into the gap between the lip 109 and the rear end face of the male portion 52. The outer side of that portion of the blank 68 which is located within the confines of the crest 107 constitutes a mirror surface. The inner surface of such central portion of the blank 68 is spaced from the spokes 108 by a distance $d$; this insures that the central portion of the blank 68 is heated or cooled to the same extent from both sides to reduce the likelihood of fogging. The exposed reflecting side of the blank 68 can be readily cleaned by wiping because the crest 107 extends beyond the front end of the female frame portion 51. The spokes or ribs 108 are preferably of triangular cross-sectional outline and are positioned in such a manner that one of their apexes is adjacent to the inner surface of the central portion of the blank 68. This further enhances circulation of air at the inner side of the blank and assures equal heating or cooling at both sides which reduces the likelihood of fogging. The likelihood of such fogging is further reduced by the fact that the central portion of the blank 68 is not immediately adjacent to any heat-storing part or parts. Furthermore, the spokes 108 protect the inner side of the blank against damage, for example, by the tongue or by a tooth of the patient. The so-called cord friction is a phenomenon which develops due to the fact that the female frame portion 51 exerts a radially inwardly oriented compressive stress on the male frame portion 52; such friction assures proper retention of the blank 68 in the position shown in FIG. 4 and is particularly effective at an angle of about 180°.

Figure 5:
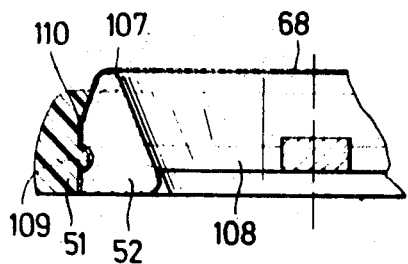
FIG. 5 is a similar sectional view of a slightly modified mirror.

FIG. 5 illustrates a portion of a slightly modified mirror which includes a blank 68 and two angular mirror frame portions 151, 152. The manner in which the blank 68 overlaps the crest 107' of the frame portion 152 is the same as shown in FIG. 9. One of these frame portions, for example the inner or male frame portion 152, is provided with at least one angular external groove which accommodates an internal bead or protuberance 109' on the frame portion 151 to thus prevent accidental separation of the portions 151, 152.

The bead 109' and the corresponding groove replace the lid 109 of the frame portion 51 shown in FIG. 4. Thus, the lid 109 can be dispensed with and the rear end face of the frame portion 151 can be flush with the rear end face of the portion 152. The numeral 110' denotes an internal conical surface of the frame portions 151 which prevents expulsion of the frame portion 152 forwardly and beyond the front end of the frame portion 151. The male frame portion 152 is provided with ribs or spokes 108' of rectangular cross-sectional outline. The marginal portion of the blank 68 is draped around the bead 109' and is thus properly clamped between the frame portions 151, 152.

Figure 1:
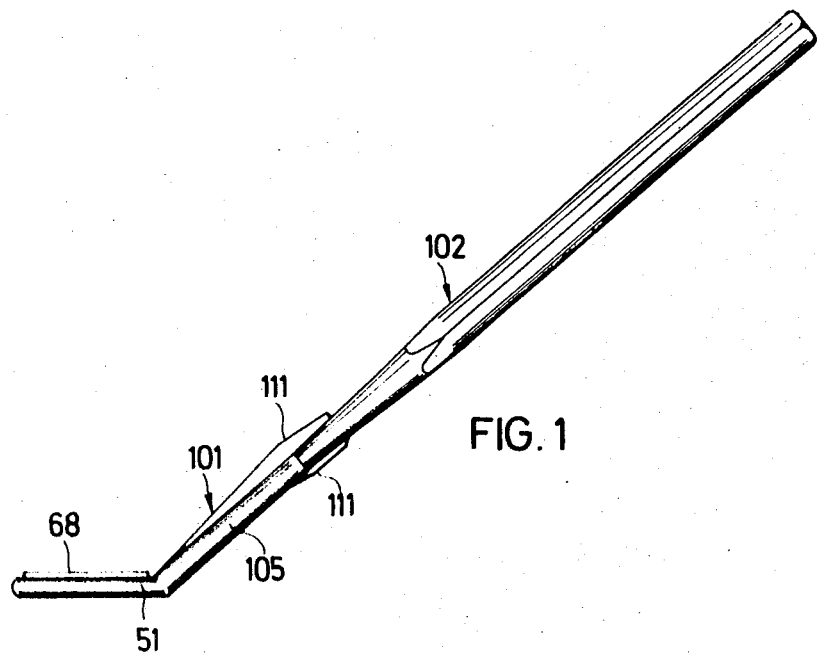
FIG. 1 is a side elevational view of a mirror, particularly for use by dentists, and which is shown connected to an elongated handle to form therewith a structure suited for use by dentists or for analogous purposes.
Figure 2:
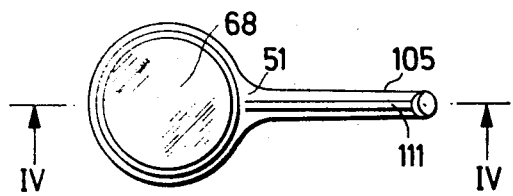
FIG. 2 is a plan view of the mirror.

If desired, the lower axial end of the male frame portion 52 or 152 (as viewed in FIGS. 4 or 5) can be provided with a bottom plate which prevents penetration of dust, dirt or other foreign matter to the inner side of the respective blank 68. Such bottom plate also enhances the appearance of the mirror. The manner in which the mirror including portions 151, 152 and blank 68 of FIG. 5 is separably connected to a suitable handle is preferably the same as shown in FIGS. 1 and 3.

It will be understood that each of the elements described above, or two or more together, may also find a useful application in other type of constructions differing from the types described above.

While the invention has been illustrated and described as embodied in a dentist's mirror, it is not intended to be limited to the details shown, since various modifications and structural changes may be made without departing in any way from the spirit of the present invention.

What is claimed is:
1. A mirror, particularly for use by dentists, comprising a blank consisting of thin light-reflecting flexible sheet material and having a main portion and a marginal portion; and a substantially ring-shaped frame having cooperating first and second separate annular frame portions clampingly engaging the marinal portion of said blank stretching the same, and holding the main portion in taut condition with opposite faces of said main portion freely accessible to the surrounding atmosphere.

2. A mirror as defined in claim 1, wherein one of said frame portions constitutes a female portion and the other portion constitutes a male portion and is clampingly received in said female portion.

3. A mirror as defined in claim 2, wherein said male portion extends beyond said female portion and is provided with a ring-shaped crest extending between the marinal and central portions of said blank.

4. A mirror as defined in claim 2, wherein said female portion has an internal surface which tapers from one toward the other axial end thereof and wherein said male portion has a complementary external surface, said marginal portion of the blank being clampingly received between said surfaces.

5. A mirror as defined in claim 4, wherein said male portion is a press-fit in said female portion and wherein said interior of said female portion is at least slightly elastic to subject the male portion to a radially inwardly oriented compressive stress.

6. A mirror as defined in claim 2, wherein said male portion is substantially rigid and said female portion is at least slightly elastic.

7. A mirror as defined in claim 2, wherein said female portion has a part which overlaps one end of said female portion.

8. A mirror as defined in claim 7, wherein the marginal portion of the blank is clamped between said end of the male portion and said overlapping part of the female portion.

9. A mirror as defined in claim 2, wherein one of said frame portions is provided with an extension.

10. A mirror as defined in claim 9, and further comprising a handle non-rotatably connected with said extension.

11. A mirror as defined in claim 2, wherein one of said frame portions has a substantially angular rib and the other frame portion has a groove receiving said rib to thereby hold said frame portions against separation from each other.

12. A mirror as defined in claim 2, wherein said male portion comprises a substantially radially inwardly extending stiffening means.

13. A mirror as defined in claim 12, wherein said stiffening means is spaced from the centrol portion of said blank.

References Cited

UNITED STATES PATENTS

| | | | |
|---|---|---|---|
| 751,950 | 2/1904 | Sharp | 32—69 |
| 2,625,858 | 1/1953 | Dreher | 32—69X |

FOREIGN PATENTS

| | | | |
|---|---|---|---|
| 1,024,347 | 3/1966 | Great Britain | 260—88 |

ROBERT PESHOCK, Primary Examiner